W. E. ELDRIDGE.
TRACTOR FOR WAGONS AND THE LIKE.
APPLICATION FILED JUNE 17, 1914.
1,155,713.
Patented Oct. 5, 1915.
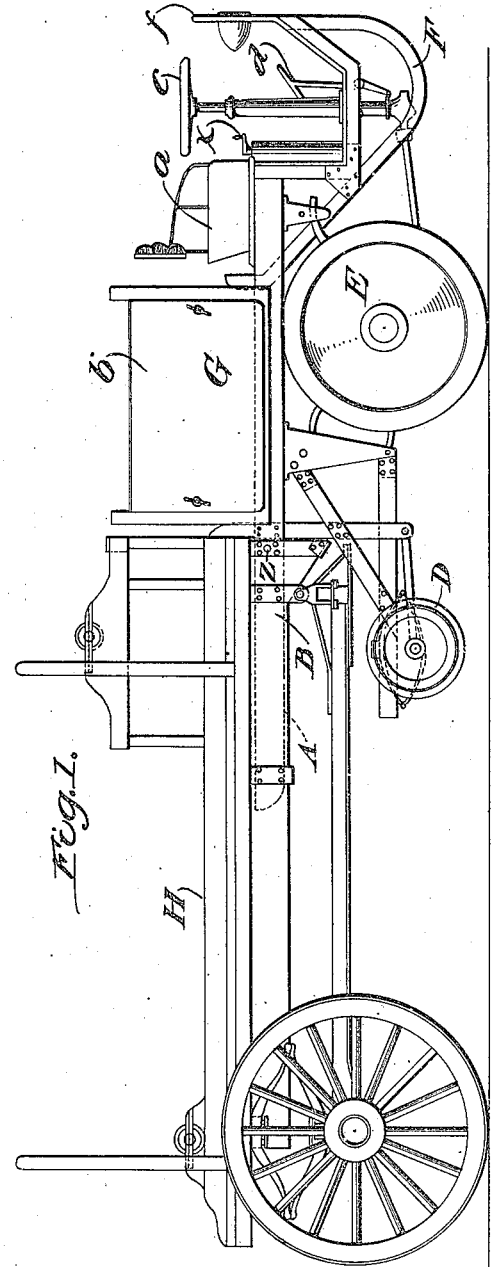
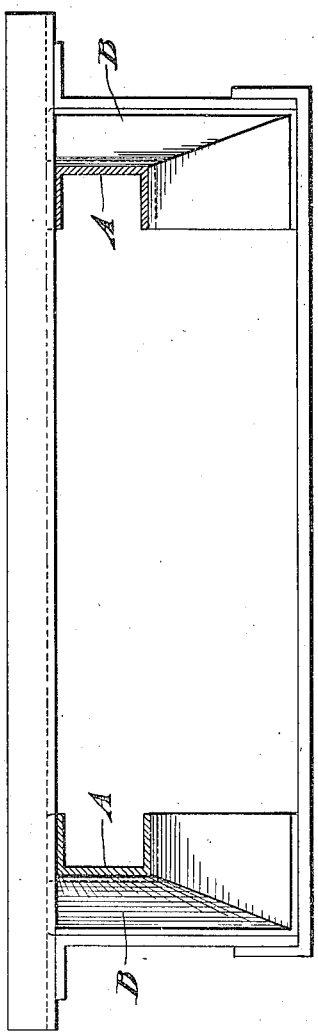
Attest:
E. M. Hamilton
Ewd L. Tolson
Inventor:
William E. Eldridge.
by Spear Middleton Donaldson Spear
Attys.

UNITED STATES PATENT OFFICE.

WILLIAM E. ELDRIDGE, OF BOSTON, MASSACHUSETTS.

TRACTOR FOR WAGONS AND THE LIKE.

1,155,713.  Specification of Letters Patent.  Patented Oct. 5, 1915.

Application filed June 17, 1914. Serial No. 845,676.

*To all whom it may concern:*

Be it known that I, WILLIAM E. ELDRIDGE, citizen of the United States, residing at Boston, Massachusetts, have invented certain new and useful Improvements in Tractors for Wagons and the like, of which the following is a specification.

My invention is designed to provide a detachable tractor for wagons or other form of carriers, the wagons being utilized as semi-trailers, and while I prefer to use as the driving power what is known as the couple gear driving wheels, I do not limit myself in this connection, as other forms of motive power may be used.

In the accompanying drawing, I have shown in Figure 1 in side elevation a lumber wagon having my front drive tractor attached thereto; Fig. 2 is a detail view of the means of connection between the wagon and the tractor.

In these drawings the lumber wagon is shown at H, and is representative of any form of carrier for freight and the like. This may be of ordinary construction, except in the particulars indicated relating to the connection with the tractor. The tractor is shown at G, and consists of a suitable framework furnishing a support for the driver at $a$, a compartment for the storage battery at $b$ if batteries are used, a steering device being shown at $c$. I prefer to utilize two driving wheels of the type known as couple gear which furnish the driving force, and which also serve to steer the device, the control of the wheels both for steering and driving being through the wheel $c$, the controller $x$ and the foot brake lever $d$. The couple gear driving wheels are indicated at E, and are arranged forward of the center of gravity of the tractor. In advance of the wheels is a skid F which may terminate in a dash-board $f$, and extending rearwardly of the tractor frame are small wheels D suitably supported and held above the ground when the tractor is in working connection with the wagon. When not in connection or when being disconnected, the wheels D will rest upon the ground and support the tractor with its driving wheels and allow independent movement thereof. The skid is to prevent any tendency of tipping forward to too great an extent, and if desired may be provided with wheels similar to the wheels at the rear end of the tractor. It will be understood that this tractor is intended to be used in connection with lumber or like wagons which are hauled around the lumber yard by horses until they are fully loaded, and while the tractor has gone on a trip with a previously loaded wagon.

In order that the tractor on its return from a delivery trip may be readily detached from one wagon and attached to a freshly loaded one, I provide the following described coupling means. Each wagon is provided with a pair of guideways B, B, formed by a metal frame secured to the body, and the walls of these guideways flare outwardly and downwardly at their forward ends. Projecting from the rear of the tractor forming a continuation of the frame members thereof are the longitudinal beams A which are adapted to enter the guides B and accurately fit therein. The flaring mouths of the guides are for the purpose of enabling the tractor to automatically couple itself up to the wagon body, as all that it is necessary to do is to back the tractor up until the inclined ends of the bars A of the tractor enter the flaring forward portions of the guides. Further backward movement of the tractor causes the bars A to ride upwardly until they enter the narrow portions of the guides, thus tipping the tractor in a horizontal position and coupling the parts in the position shown in Fig. 1. After the bars are in place in the sockets they may be held therein by any suitable means such, for instance, as a pin $z$ passing through alining holes on each side.

I claim as my invention:

1. A motor vehicle comprising in combination a main body part, rear supporting wheels therefor, said body part being provided with longitudinal guide ways extending for some distance on either side, a tractor, front driving and steering wheels therefor, a pair of rigid rearwardly extending coupling members on said tractor adapted to engage in said guideways, means for directing said members into said guideways in assembling the vehicle parts and means for securely fastening said coupling members in said guideways whereby a detachably connected motor vehicle is provided, substantially as described.

2. A motor vehicle comprising in combination a main body part, rear supporting wheels therefor, a driving tractor detachable therefrom, said tractor being supported upon combined driving and steering wheels, a pair of rearwardly extending coupling members on said tractor adapted to engage the said body part, said tractor being further provided with a depending front portion and a depending rear portion adapted to support said tractor and prevent tilting when detached from said body portion.

In testimony whereof, I affix my signature in presence of two witnesses.

WILLIAM E. ELDRIDGE.

Witnesses:
MILDRED L. GRATTAN,
WALTER O. ADAMS.